(12) United States Patent
Domen et al.

(10) Patent No.: US 6,878,666 B2
(45) Date of Patent: Apr. 12, 2005

(54) PHOTOCATALYST MADE OF METAL OXYNITRIDE HAVING RESPONSIBILITY OF VISIBLE LIGHT

(75) Inventors: Kazunari Domen, Kanagawa (JP); Michikazu Hara, Kanagawa (JP); Junko Nomura, Kanagawa (JP)

(73) Assignee: Japan Science and Technology Agency, Saitama (JP)

(*) Notice: Subject to any disclaimer, the term of this patent is extended or adjusted under 35 U.S.C. 154(b) by 0 days.

(21) Appl. No.: 10/110,675

(22) PCT Filed: Jul. 11, 2001

(86) PCT No.: PCT/JP01/06016

§ 371 (c)(1),
(2), (4) Date: Apr. 16, 2002

(87) PCT Pub. No.: WO02/18048

PCT Pub. Date: May 7, 2002

(65) Prior Publication Data

US 2002/0151434 A1 Oct. 17, 2002

(30) Foreign Application Priority Data

Aug. 28, 2000 (JP) ........................................ 2000-256681

(51) Int. Cl.⁷ ............................ B01J 27/24; B01J 23/00; C04B 35/00
(52) U.S. Cl. ........................ 502/200; 502/351; 501/96.1
(58) Field of Search ................................ 502/200, 351; 501/96.1

(56) References Cited

U.S. PATENT DOCUMENTS 4,734,390 A * 3/1988 Marchand et al. ............ 501/96

| | | | | |
|---|---|---|---|---|
| 5,473,468 A | * | 12/1995 | Rudigier et al. | ............ 359/359 |
| 5,494,743 A | * | 2/1996 | Woodard et al. | ............ 428/336 |
| 5,685,968 A | * | 11/1997 | Hayakawa et al. | ......... 205/122 |
| 5,712,534 A | * | 1/1998 | Lee et al. | ................ 315/169.3 |
| 6,154,311 A | | 11/2000 | Simmons, Jr. et al. | |
| 6,171,900 B1 | * | 1/2001 | Sun | ............................ 438/240 |
| 2002/0006865 A1 | * | 1/2002 | Morikawa et al. | ......... 502/200 |
| 2002/0169076 A1 | * | 11/2002 | Takeshi et al. | ............ 502/350 |
| 2003/0062590 A1 | * | 4/2003 | Anthony | ..................... 257/529 |

FOREIGN PATENT DOCUMENTS

| | | | | |
|---|---|---|---|---|
| JP | 2001-205104 A | | 7/2001 | |
| JP | 2002-66333 | * | 3/2002 | ............ B01J/35/02 |
| JP | 2002-321907 | * | 11/2002 | ............ B01J/31/38 |
| WO | WO01/54811 | | 8/2001 | |

OTHER PUBLICATIONS

Hara, et al., Solar Energy Conversion by Photocatalyst, Materials Integration vol. 14 No. 2 pp 7–11 (2001). With English Translation, no month avaiable.

* cited by examiner

Primary Examiner—Mark L. Bell
Assistant Examiner—Patricia L. Hailey
(74) Attorney, Agent, or Firm—Sherman & Shalloway

(57) ABSTRACT

A photo-catalyst comprising of oxynitride of at least one transition metal and oxynitride of transition metal further containing at least one element selected from the group consisting of alkali, alkali earth and IIIB group. Especially, the transition metal contained in said photo-catalyst comprising of oxynitride of transition metal is selected from the group consisting of La, Ta, Nb, Ti and Zr, and further containing metal is selected from the group consisting of Ca, Sr, Ba, Na, K and Rb. Desirably, a promoter comprising Pt or Ni is loaded on said oxynitride of transition metal.

7 Claims, 14 Drawing Sheets

… (5)

PHOTOCATALYST MADE OF METAL OXYNITRIDE HAVING RESPONSIBILITY OF VISIBLE LIGHT

FIELD OF THE INVENTION

This invention relates to a novel photo catalyst, especially relates to a photo-catalyst being active to visible-light comprising oxynitride containing at least one transition metal, and a photo-catalyst used for the water-splitting.

BACKGROUND OF THE INVENTION

The following photo-catalytic reaction is well-known as a technique to obtain an aimed subject. That is, the light is irradiated to a solid compound which has a photo-catalytic function so as to generate excited electrons or holes. Then a substance is oxidized or reduced by said excited electrons or holes and obtain the aimed subject.

Especially, the photocatalytic decomposition reaction of water is broadly interested from the view point of photo energy convertion. While, a photo-catalyst which shows activity to the photocatalytic decomposition reaction of water can be considered to be a high quality photo functional material possessing functions such as photo absorption, electric charge separation or surface oxidation-reduction reaction.

Kudo, Kato et al are explaining that alkali tantalats are the photocatalyst showing high activity to the stoichiometric photocatalytic decomposing reaction of water by quoting various prior arts [Catal. Lett., 58(1999). 153–155, Chem. Lett., (1999), 1207, Surface Vol. 36, No. 12(1998), 625–645 (shortened to document A)]. In above mentioned document A, there is an explanation about an useful photo-catalytic materials for proceeding the decomposing reaction of water to hydrogen and/or oxygen using a photo-catalyst, and many indications about photo-catalyst used for stoichiometric photocatalytic decomposing reaction of water are mentioned.

Further, they are referring to the photo-catalyst which carrying a promoter such as platinum or NiO.

However, the photo-catalysts explained in these documents are mainly the compound containing oxygen as a non-metallic element. And, since the band gap energy of various solid photo-catalyst is larger than 3 eV, it is difficult to activate it by low energy under 3 eV. The band gap energy can be explained as the width of a forbidden band exists between a valence electron band and a conduction band. On the contrary, almost all of the conventional solid photo-catalyst which can generate electrons or holes by visible-light radiation are unstable under the condition of photo-catalytic water decomposing reaction. For example, the band gap energy of CdS or Cu—ZnS are 2.4 eV, but the catalytic reaction is restricted because it is affected by photo-corrosive action, which is corrosive oxidative action.

Almost all of the sun light which reaches to the surface of the earth is the visible light radiation of lower energy. Therefore, for the purpose to progress various photocatalytic reactions effectively, a photo-catalyst which acts by visible light and is the corrosion resistance is necessary. However, among the conventional technique, there is no technique to satisfy the above mentioned requirement.

In the meanwhile, as mentioned above, almost all of the sunlight which can use at the surface of the earth is the visible light radiation and the object of the present invention is to provide a photo-catalyst which can generate an excitation electron or a hole by visible light radiation and is stable under various oxidative and reductive reactions.

Almost all of conventional stable photo-catalysts are containing oxygen as a non-metallic element. In cases of these compounds, the relative energy gap of a valence band and a conduction band is largely controlled by the energy level of oxygen, energy of O 2p orbit, therefore, the band gap energy is small and can not generate photo-catalytic function by visible light radiation. The inventors of the present invention have noticed that a novel photo-catalyst which acts by visible light radiation will be able to be developed if the following compounds with higher valence energy level than $O_2$ is developed. That is, the compound that when an element whose valence electron's energy is higher than that of oxygen is bonded with a metal and hybridize these valence electron orbits, an energy level of the valence energy band is elevated and can reduce the band gap energy and is stable under the photo-catalytic reactive condition.

Since the valence electron of nitrogen atom has higher energy than that of an oxygen atom, the band gap energy of a metal compound containing a nitrogen atom can be made smaller than that of metal oxide. The inventors of the present invention have conjectured that metal and metal compound bonded with suitable amount of nitrogen atoms become possible to generate excitations electron and holes and will become a photocatalyst which acts by visible light irradiation. And have intensive study to find out the compound which is stable under the reacting condition of photocatalytic decomposition of water. Then the inventors of the present invention have found that the compound comprising oxynitride containing at least one transition metal acts as a photo-catalyst and have dissolved above mentioned problem. Many compounds among these compounds form perovskite structure. The stability of said compounds in photo-catalytic reaction is considered to be effected by said crystalline structure.

DISCLOSURE OF THE INVENTION

The present invention is a photo-catalyst comprising oxynitride containing at least one transition metal. Desirably, the present invention is the photo-catalyst comprising oxynitride, wherein the transition metal is at least one selected from the group consisting of La, Ta, Nb, Ti and Zr. More desirably, the present invention is the photo-catalyst comprising oxynitride further containing at least one element selected from the group consisting of metal element belonging to alkali, alkali earth and IIIB group. Further desirably, the present invention is the photo-catalyst comprising oxynitride, wherein said metal element is at least one selected from the group consisting of Ca, Ba, Na, K and Rb. Still further desirably, the present invention is the photo-catalyst, characterizing a promoter made of transition metal is loaded on said oxynitrides. Furthermore desirably, the present invention is the photo-catalyst comprising oxynitride, wherein the promoter is Pt.

The second important point of the present invention is the photocatalyst using said oxynitride photo-catalyst for the hydrogen evolving reaction by reduction of water or for the oxygen evolving reaction by oxidation of water, namely, is the catalyst for photocatalytic decomposition of water.

BRIEF ILLUSTRATION OF DRAWINGS

Figure 3:
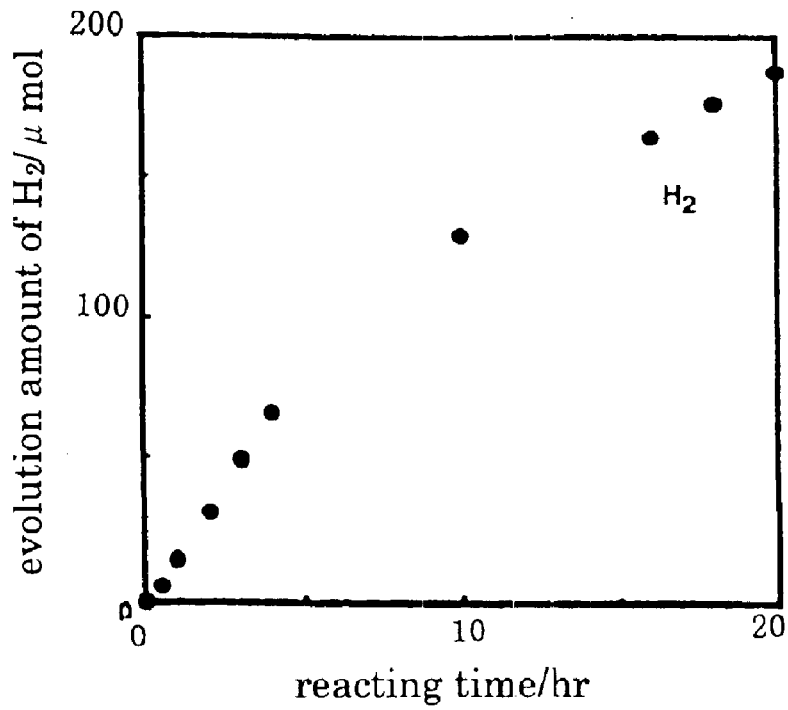

FIG. 3 is a graph showing hydrogen evolution rate by photocatalytic decomposition of water solution containing 10 vol % methanol at irradiation of the visible light longer than 420 nm using 3 wt % Pt loaded $LaTaON_2$ as a photo-catalyst.

Figure 4:
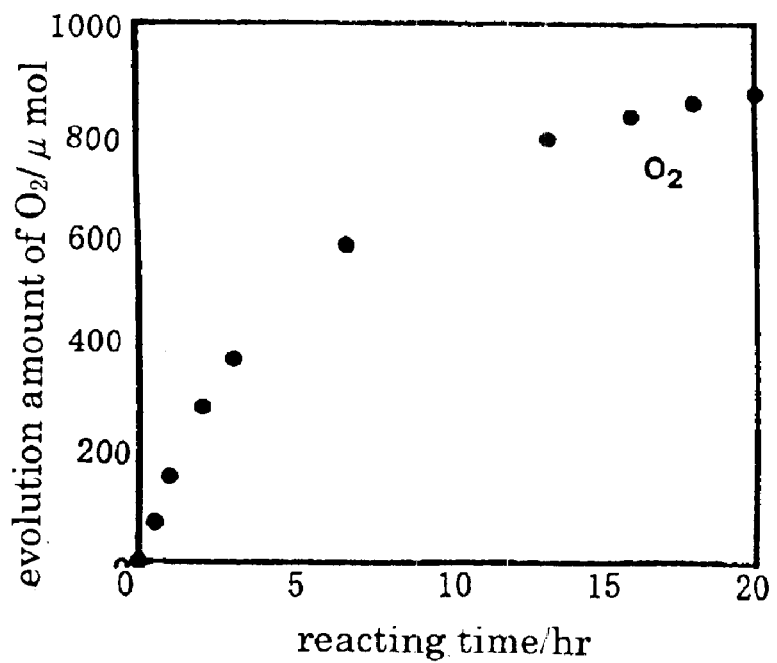

FIG. 4 is a graph showing oxygen evolution rate from 0.01 mol. $dm^{-3}$ $AgNO_3$ aqueous solution at irradiation of the visible light longer than 420 nm using 3 wt % Pt loaded $LaTaON_2$ as a photo-catalyst.

Figure 5:
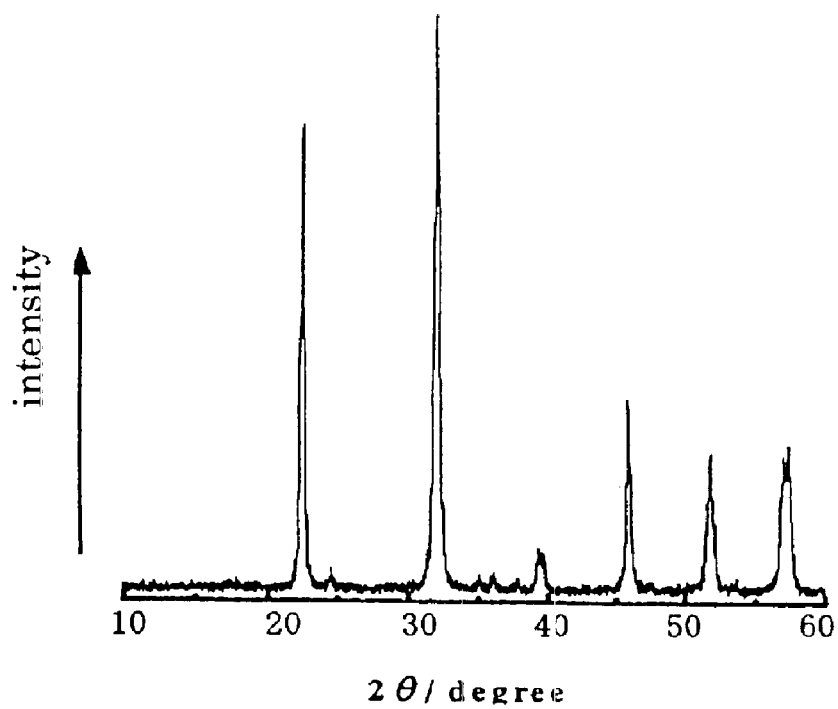

FIG. 5 is a graph showing the X-ray diffraction pattern of $CaTaO_2N$ photo-catalyst.

Figure 6:
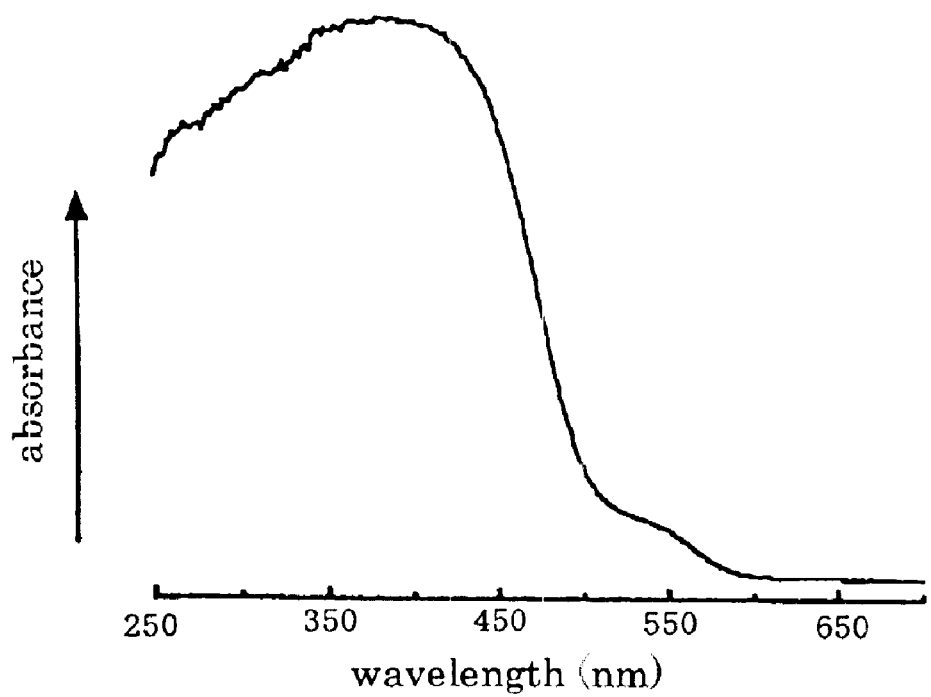

FIG. 6 is a graph showing the UV-visible diffuse reflectance spectrum of $CaTaO_2N$ photo-catalyst.

Figure 7:
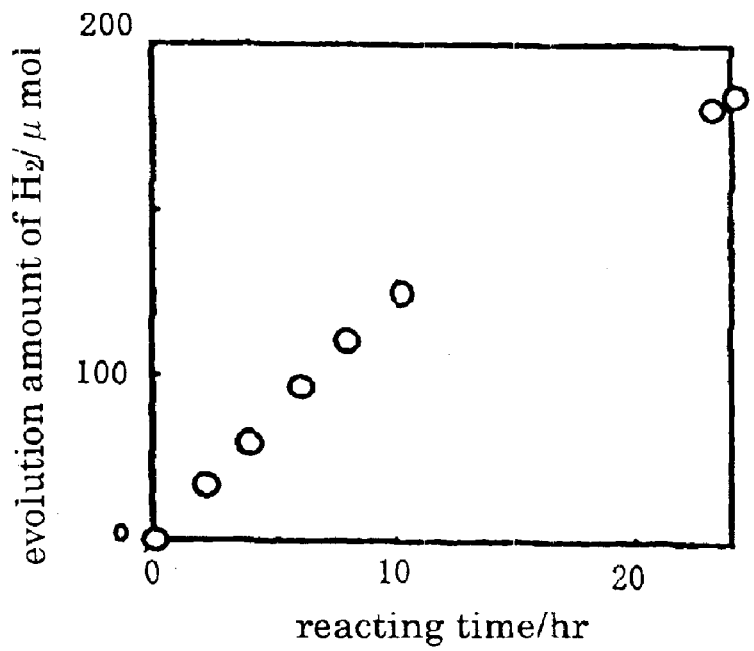

FIG. 7 is a graph showing hydrogen evolution rate by photocatalytic decomposition of water solution containing 10 vol % methanol at irradiation of the visible light longer than 420 nm using 3 wt % Pt loaded $CaTaO_2N$ as a photo-catalyst.

Figure 8:
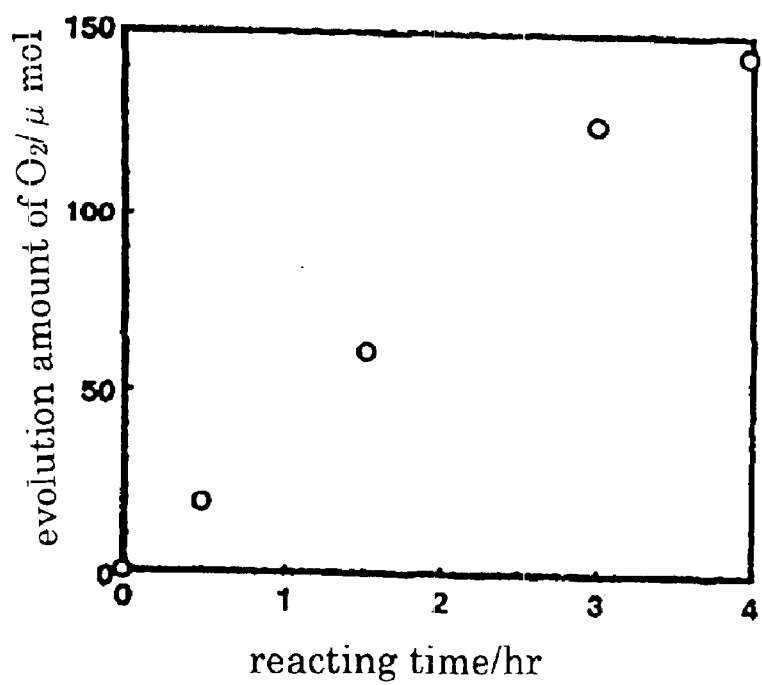

FIG. 8 is a graph showing oxygen evolution rate from 0.01 mol. $dm^{-3}$ $AgNO_3$ aqueous solution at irradiation of the visible light longer than 420 nm using 3 wt % Pt loaded $CaTaO_2N$ as a photo-catalyst.

Figure 9:
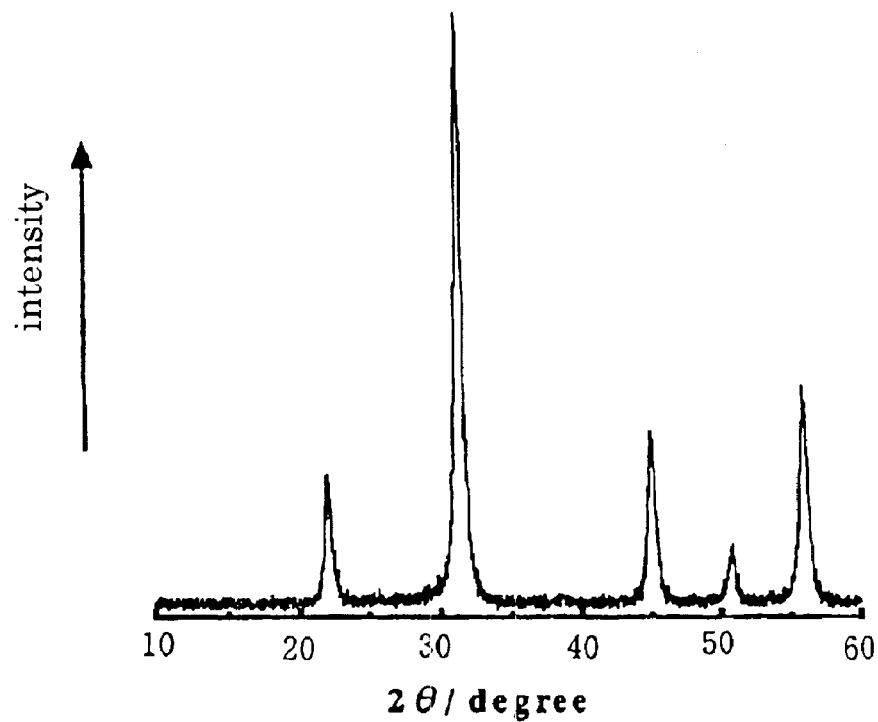

FIG. 9 is a graph showing the X-ray diffraction pattern of $SrTaO_2N$ photo-catalyst.

Figure 10:
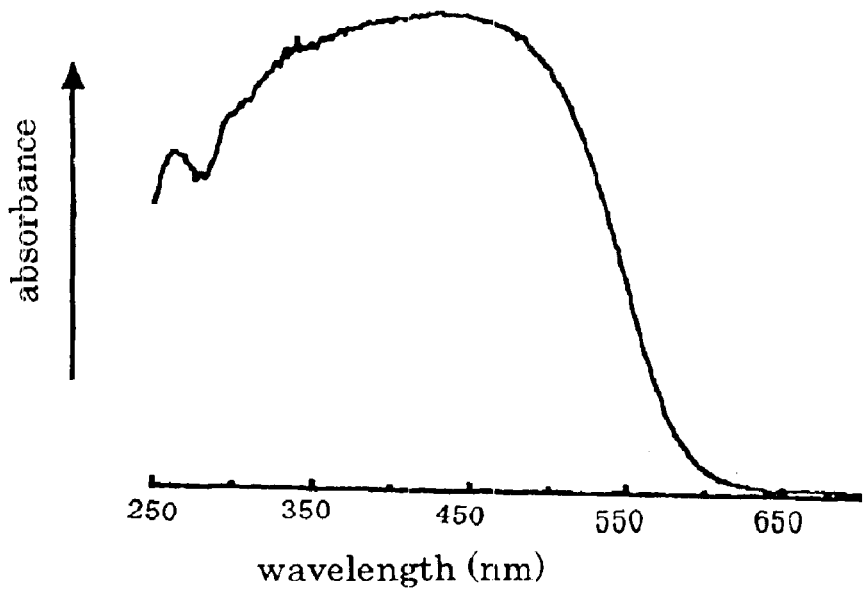

FIG. 10 is a graph showing the UV-visible diffuse reflectance spectrum of $SrTaON_2$ photo-catalyst.

Figure 11:
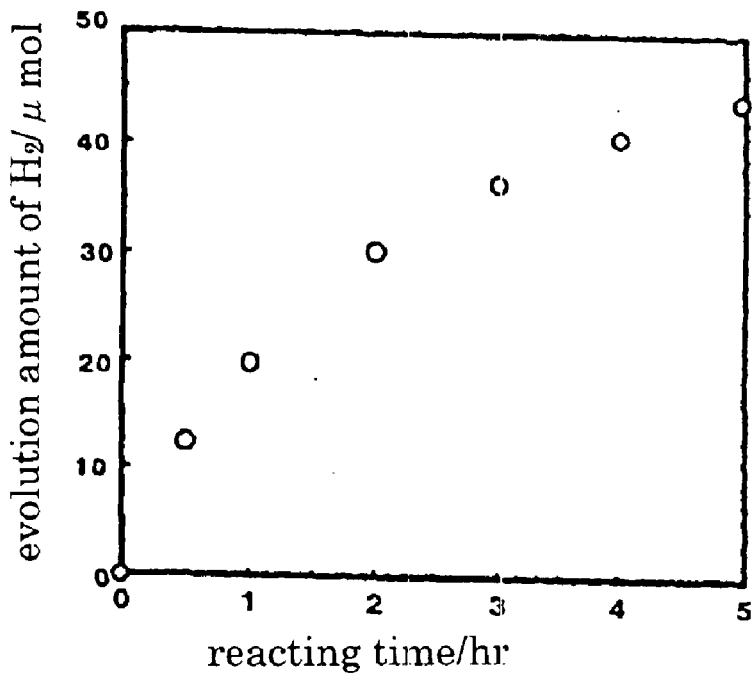

FIG. 11 is a graph showing hydrogen evolution rate by photocatalytic decomposition of water solution containing 10 vol % methanol at irradiation of the visible light longer than 420 nm using 3 wt % Pt loaded $SrTaO_2N$ as a photo-catalyst.

Figure 12:
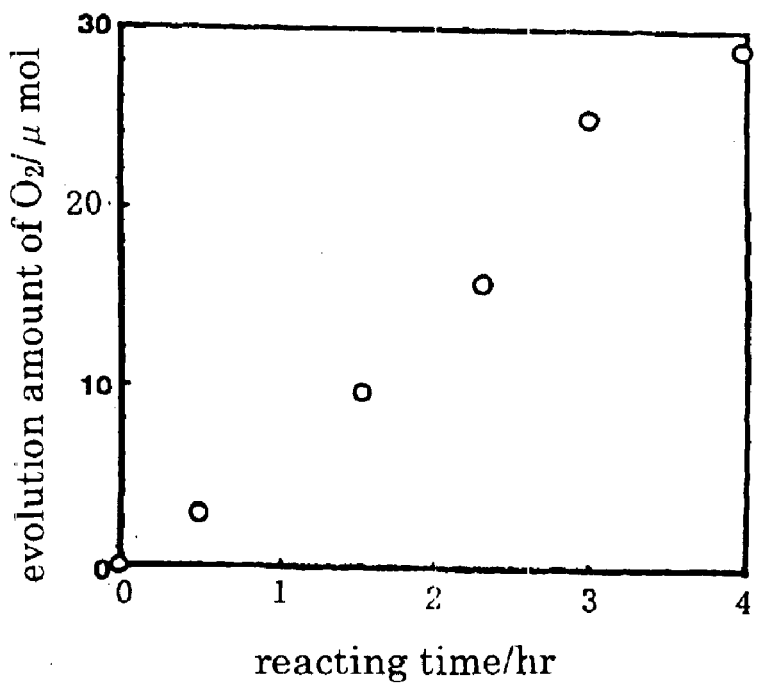

FIG. 12 is a graph showing oxygen evolution rate from 0.01 mol. $dm^{-3}$ $AgNO_3$ aqueous solution at irradiation of the visible light longer than 420 nm using 3 wt % Pt loaded $SrTaO_2N$ as a photo-catalyst.

Figure 13:
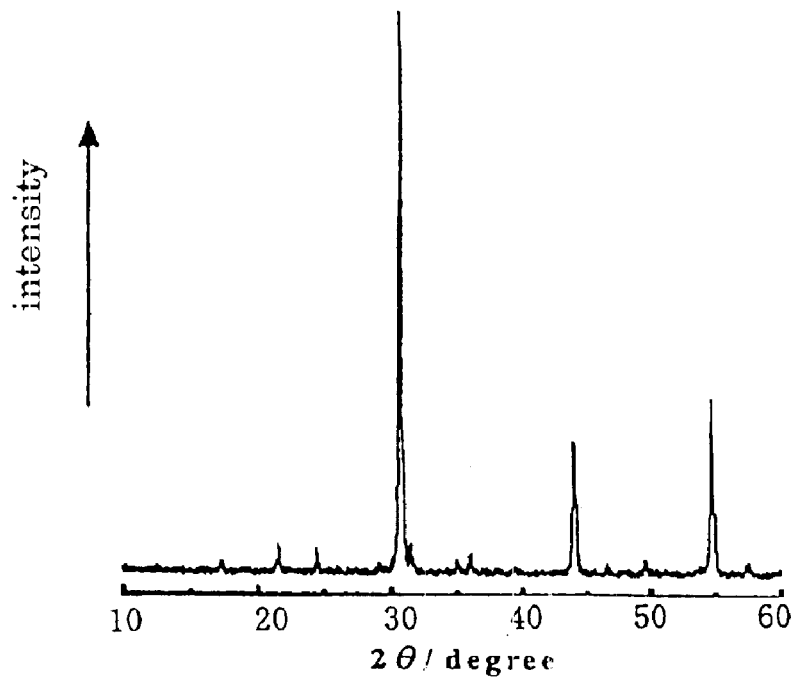

FIG. 13 is a graph showing the X-ray diffraction pattern of $BaTaO_2N$ photo-catalyst.

Figure 14:
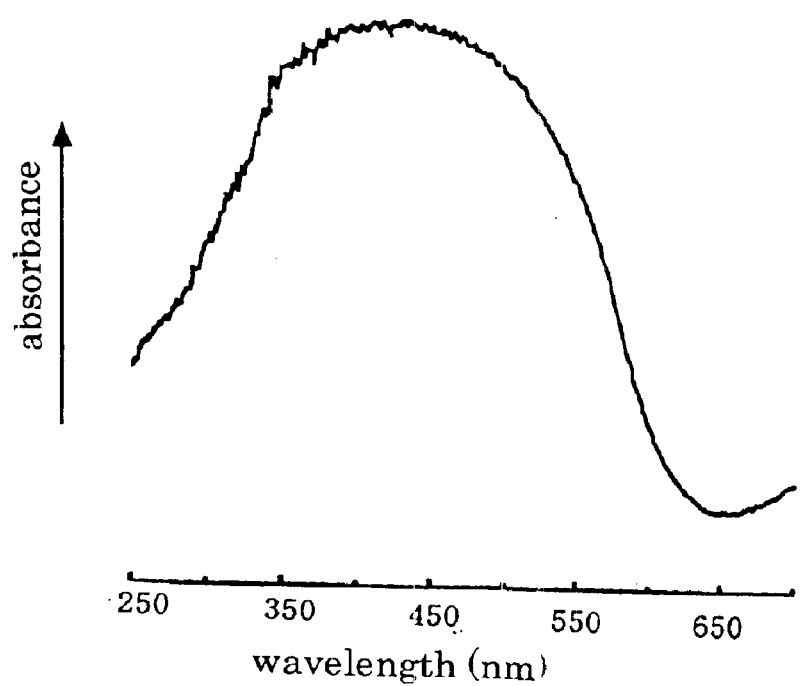

FIG. 14 is a graph showing the UV-visible diffuse reflectance spectrum of $BaTaO_2N$ photo-catalyst.

Figure 15:
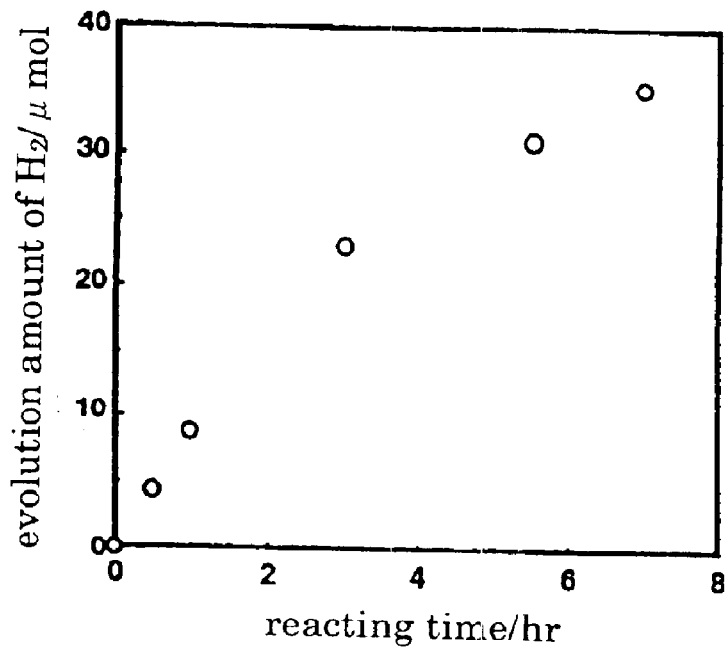

FIG. 15 is a graph showing hydrogen evolution rate by photocatalytic decomposition of water solution containing 10 vol % methanol at irradiation of the visible light longer than 420 nm using 3 wt % Pt loaded $BaTaO_2N$ as a photo-catalyst.

Figure 16:
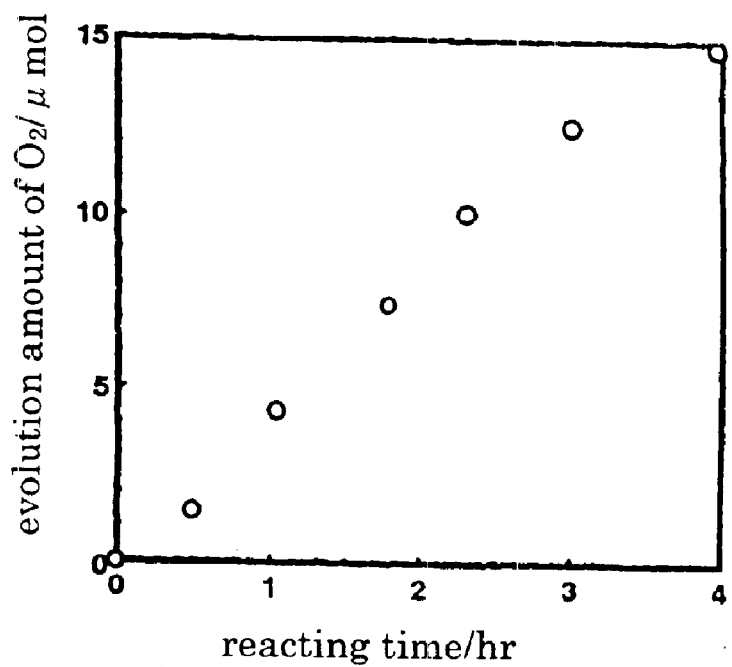

FIG. 16 is a graph showing oxygen evolution rate from 0.01 mol. $dm^{-3}$ $AgNO_3$ aqueous solution at irradiation of the visible light longer than 420 nm using 3 wt % Pt loaded $BaTaO_2N$ as a photo-catalyst.

Figure 17:
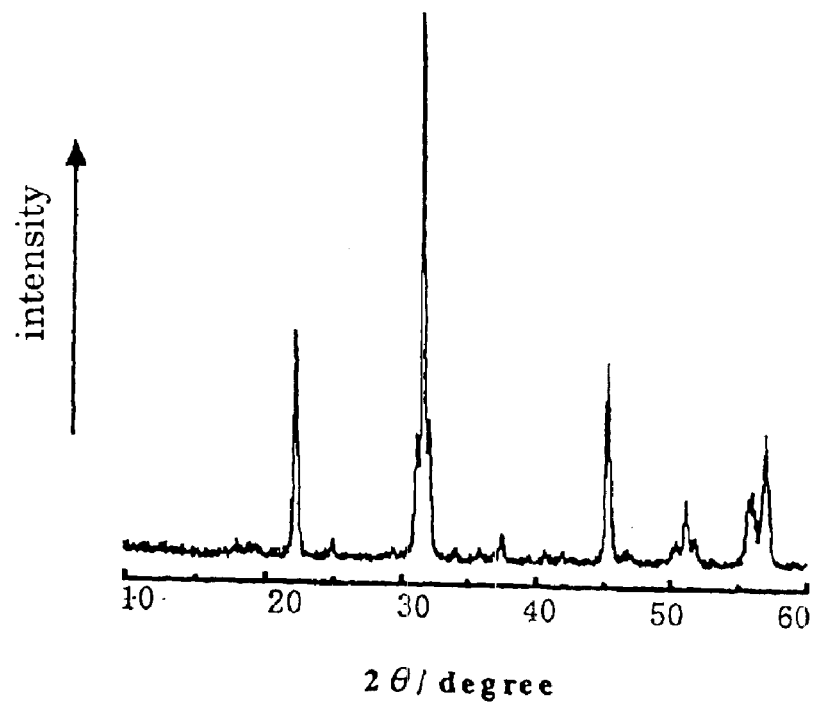

FIG. 17 is a graph showing the X-ray diffraction pattern of $CaNbO_2N$ photo-catalyst.

Figure 18:
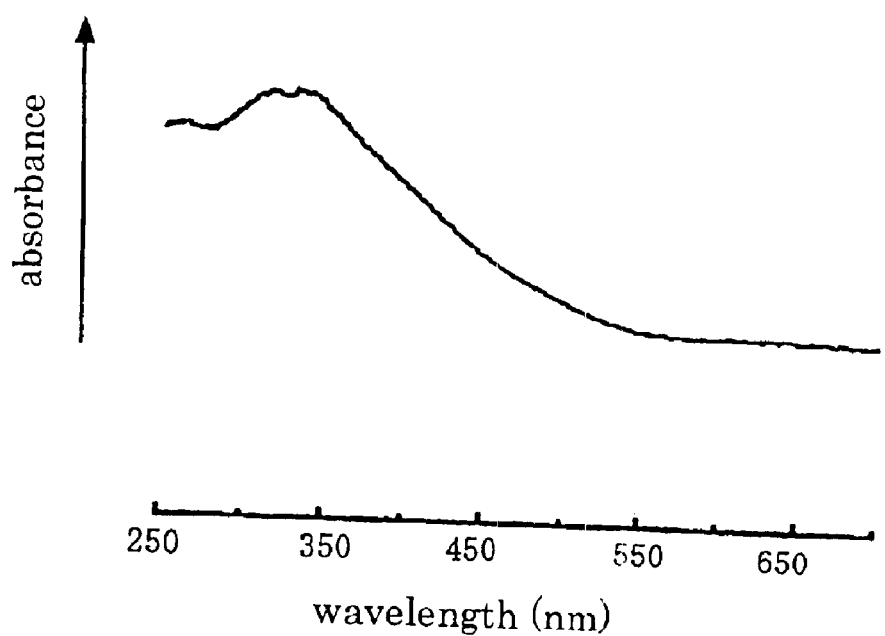

FIG. 18 is a graph showing the UV-visible diffuse reflectance spectrum of $CaNbO_2N$ photo-catalyst.

Figure 19:
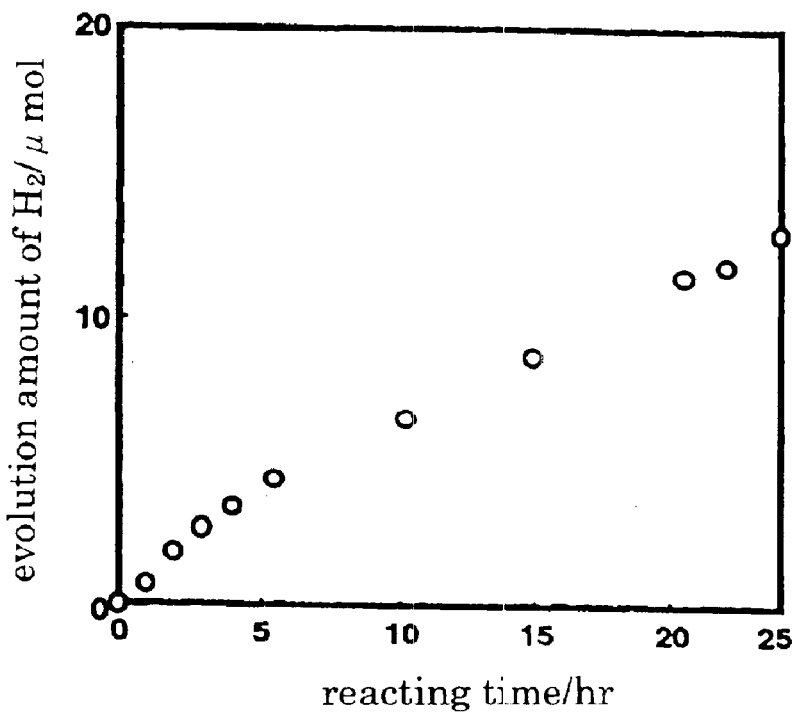

FIG. 19 is a graph showing hydrogen evolution rate by photocatalytic decomposition of water solution containing 10 vol % methanol at irradiation of the visible light longer than 420 nm using 3 wt % Pt loaded $CaNbO_2N$ as a photo-catalyst.

Figure 20:
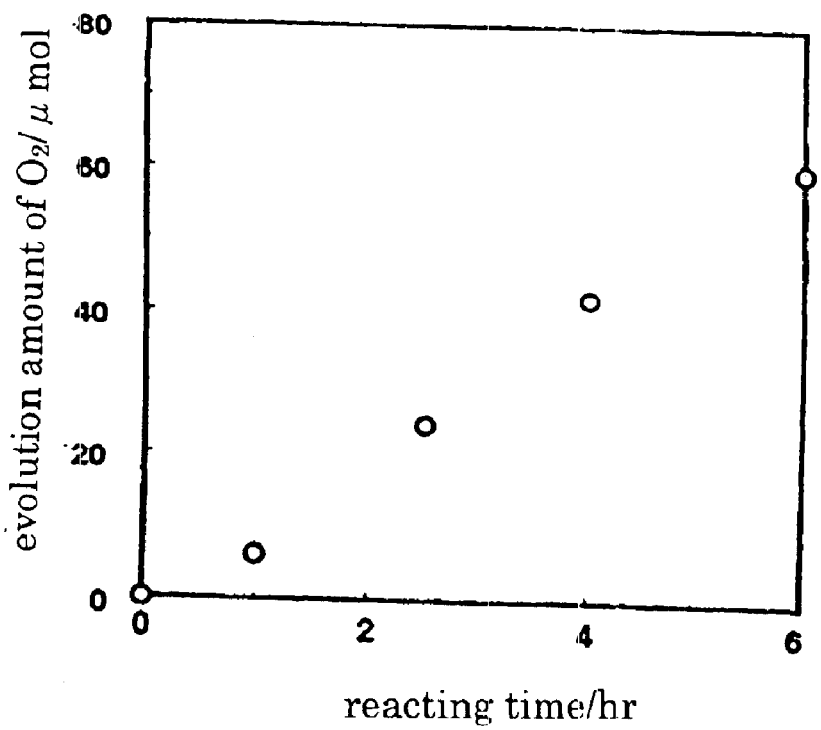

FIG. 20 is a graph showing oxygen evolution rate from 0.01 mol. $dm^{-3}$ $AgNO_3$ aqueous solution at irradiation of the visible light longer than 420 nm using 3 wt % Pt loaded $CaNbO_2N$ as a photo-catalyst.

Figure 21:
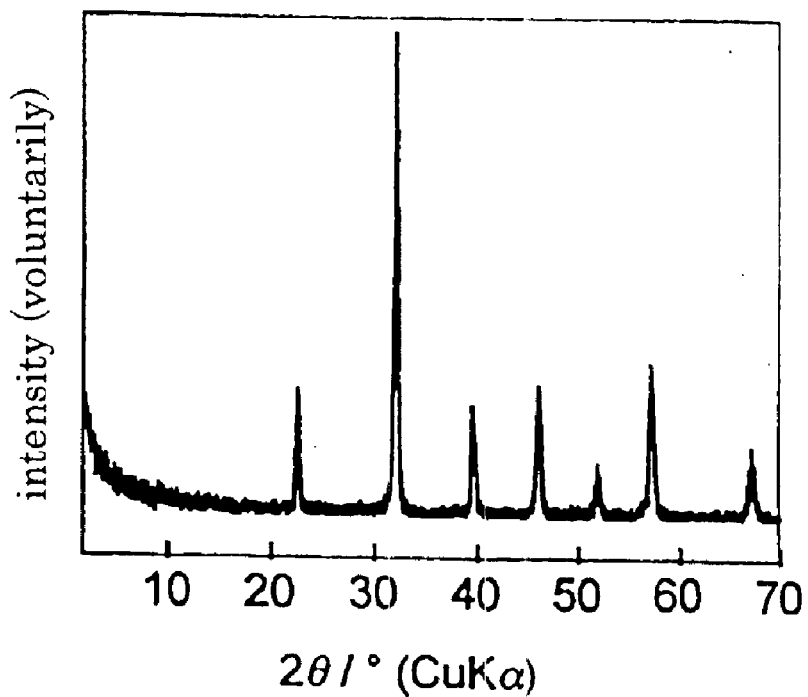

FIG. 21 is a graph showing the X-ray diffraction pattern of $LaTiO_2N$ photo-catalyst.

Figure 22:
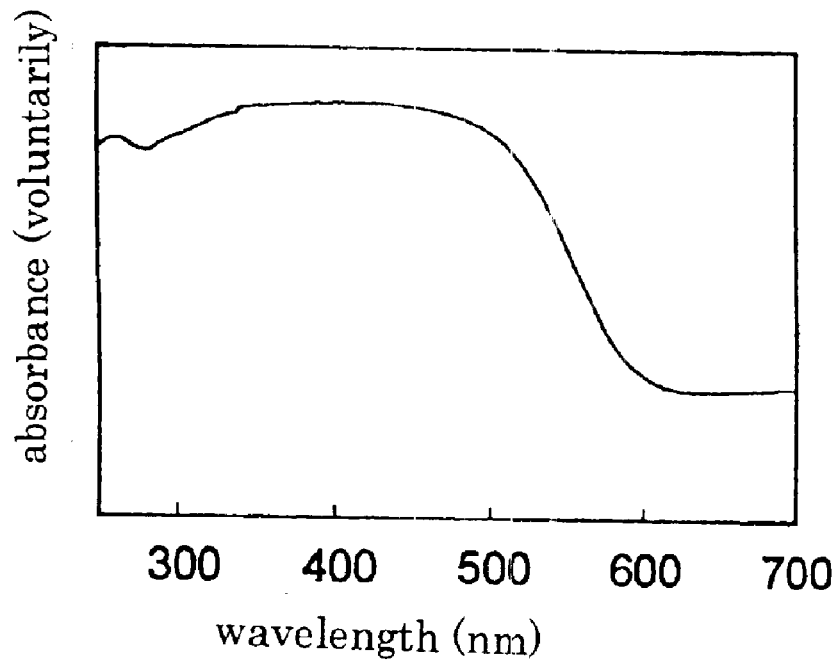

FIG. 22 is a graph showing the UV-visible diffuse reflectance spectrum of $LaTiO_2N$ photo-catalyst.

Figure 23:
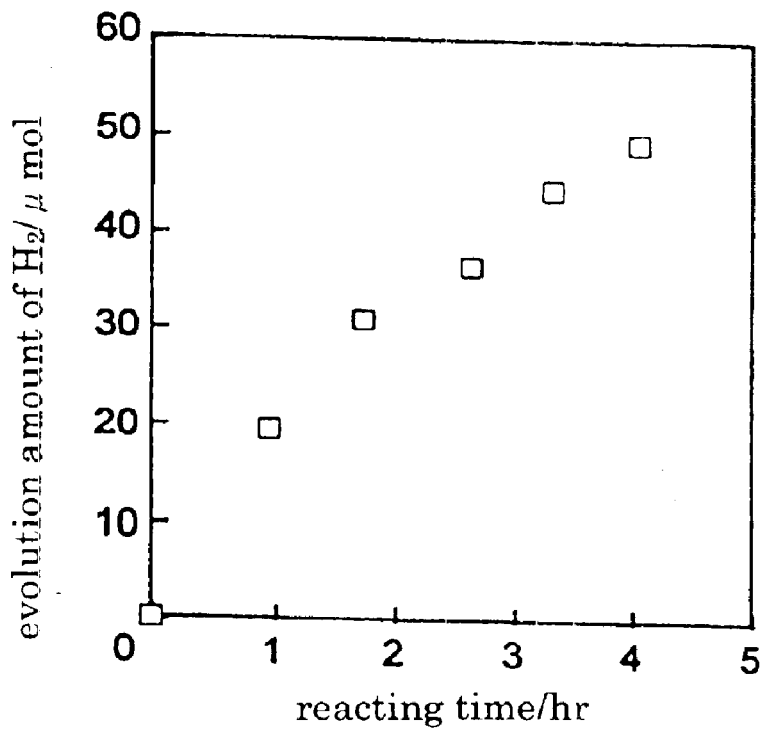

FIG. 23 is a graph showing hydrogen evolution rate by photocatalytic decomposition of water solution containing 10 vol % methanol at irradiation of the visible light longer than 420 nm using 7 wt % Pt loaded $LaTiO_2N$ as a photo-catalyst.

Figure 24:
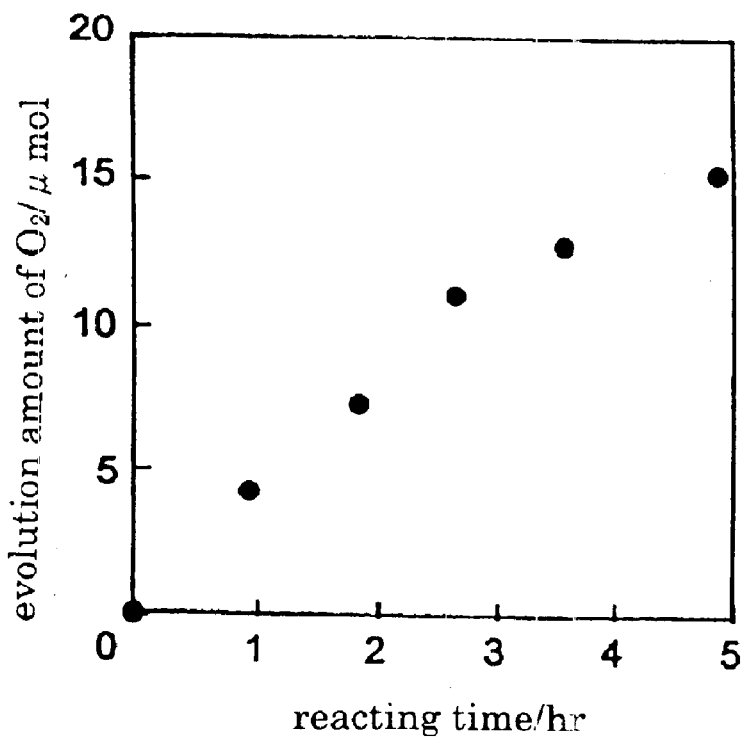

FIG. 24 is a graph showing oxygen evolution rate from 0.01 mol. $dm^{-3}$ $AgNO_3$ aqueous solution at irradiation of the visible light longer than 420 nm using 7 wt % Pt loaded $LaTiO_2N$ as a photo-catalyst.

Figure 25:
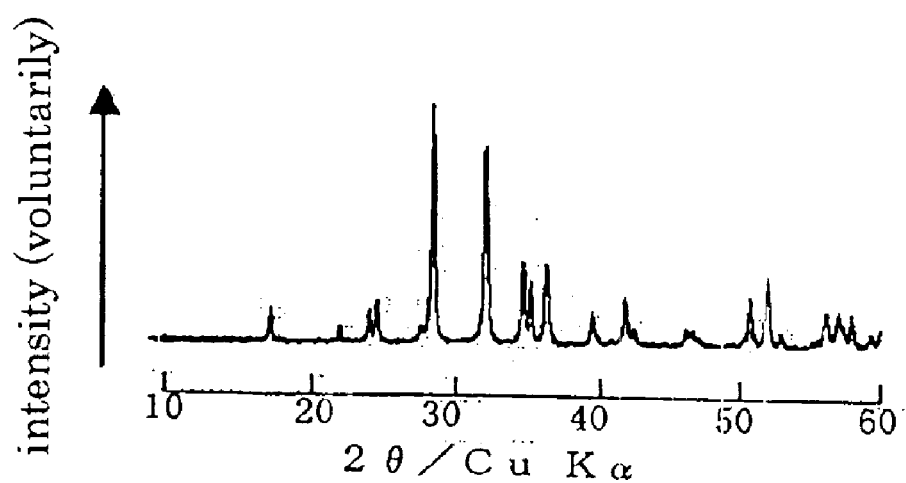

FIG. 25 is a graph showing the X-ray diffraction pattern of TaON photo-catalyst.

Figure 26:
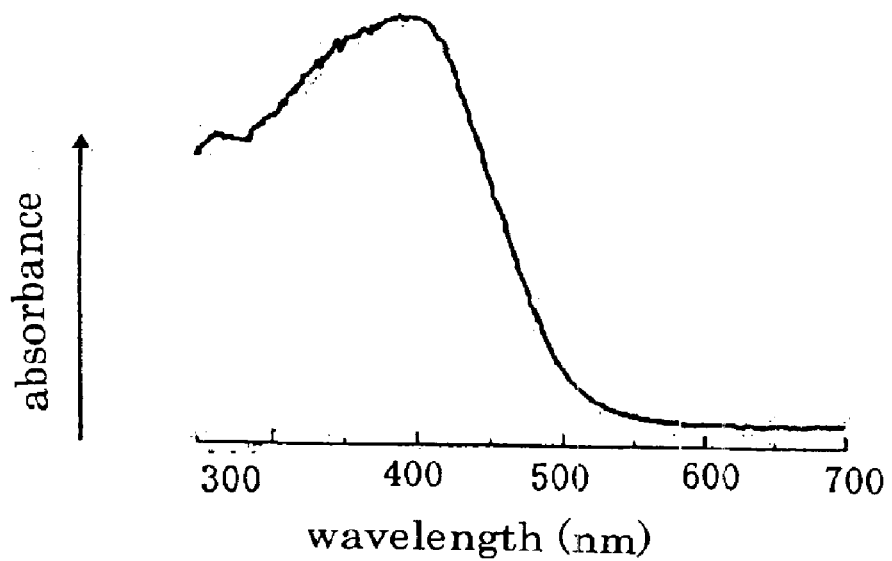

FIG. 26 is a graph showing the UV-visible diffuse reflectance spectrum of TaON photo-catalyst.

Figure 27:
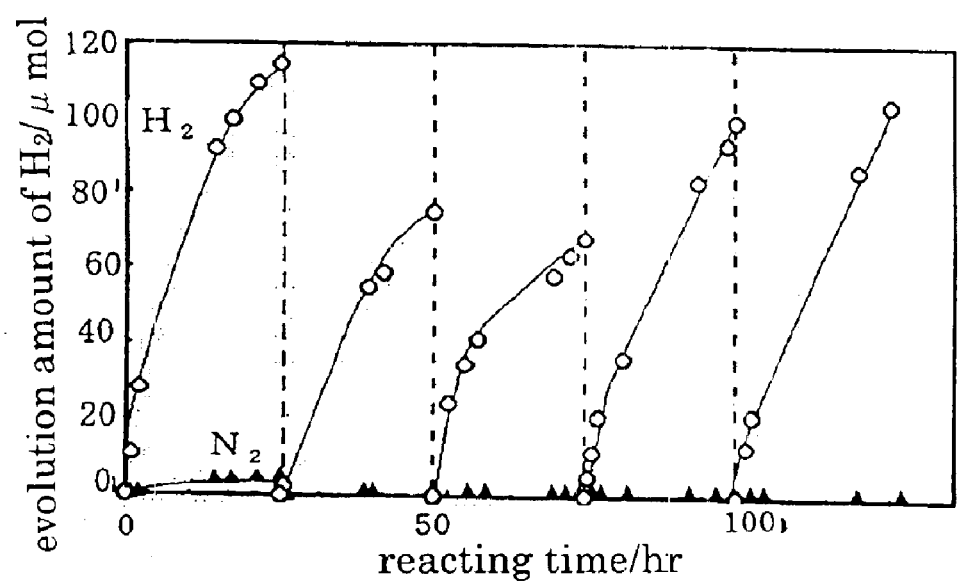

FIG. 27 is a graph showing hydrogen evolution rate by photocatalytic decomposition of water solution containing 10 vol % methanol at irradiation of the visible light longer than 420 nm using 3 wt % Pt loaded TaON as a photo-catalyst.

Figure 28:
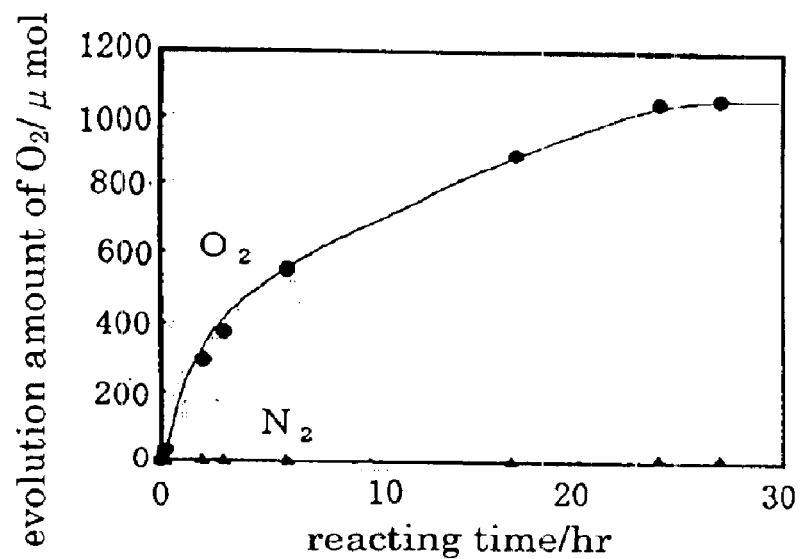

FIG. 28 is a graph showing oxygen evolution rate from 0.01 mol. $dm^{-3}$ $AgNO_3$ aqueous solution at irradiation of the visible light longer than 420 nm using 3 wt % Pt loaded TaON as a photo-catalyst.

THE BEST EMBODIMENT TO CARRY OUT THE INVENTION

The present invention will be illustrated more in details. The photo-catalyst of the present invention can be obtained by preparing a metal compound containing nitrogen atom which has absorption in visible light range by reacting a metal compound with a nitrogen containing compound. As the metal compound to be a starting material, metal oxide, metallic salt or metal complex can be used And the compound having photo-catalytic function of the present invention can be synthesized by reacting above mentioned compound alone or the mixture of those mentioned compounds with a nitrogen containing compound such as ammonia, ammonium salt, hydrazine, metal nitride, metal amide or metallic amine complex.

Especially, the synthetic method of reacting between metal oxide with ammonia is advantageous as the method for synthesizing the photo-catalyst of the present invention. In this method, ammonia acts as a reducing agent and also as a nitriding reagent.

The supplying rate of ammonia depends on the reacting temperature. That is, when the reacting temperature is high, the supplying rate increases. The suitable reacting temperature is from 400° C. to 1200° C.

EXAMPLES

Example 1

9.33 g of tantalum chloride $TaCl_3$ and 150 g of methanol are mixed and dissolved, then 150 g of ethylene glycol and 80.00 g of citric acid are added and dissolved completely at the room temperature. 11.28 g of lanthanum nitrate 6 hydrate $La(NO_3)_3 \cdot 6H_2O$ is added and dissolved at 230° C. with constant stirring. Further, after treated by heat at 400° C. and carbonized, heat treated at 700° C. for 2 hours in the atmospheric condition, and a complex oxide precursor of La and Ta is obtained. The obtained precursor is heated to 900° C. by 1° C./min temperature elevating speed under 1 $dm^3$/min ammonia gas flow rate. After reached to above mentioned temperature, above mentioned temperature is maintained for 20 hours, and then cooled down rapidly to the room temperature under He gas flow, thus oxynitride containing La and Ta is synthesized.

Pt, which is a promoter, is loaded on above mentioned oxynitride containing La and Ta by following process. Namely, tetraamminedichloroplatinum [Pt(NH$_3$)$_4$Cl$_2$] is impregnated into said oxynitride containing La and Ta on a water bath and reduced by hydrogen at 300° C. for 2 hours. The impregnation amount of the promoter can be changed in the limits from 0.1 to 5% by weight.

Figure 1:
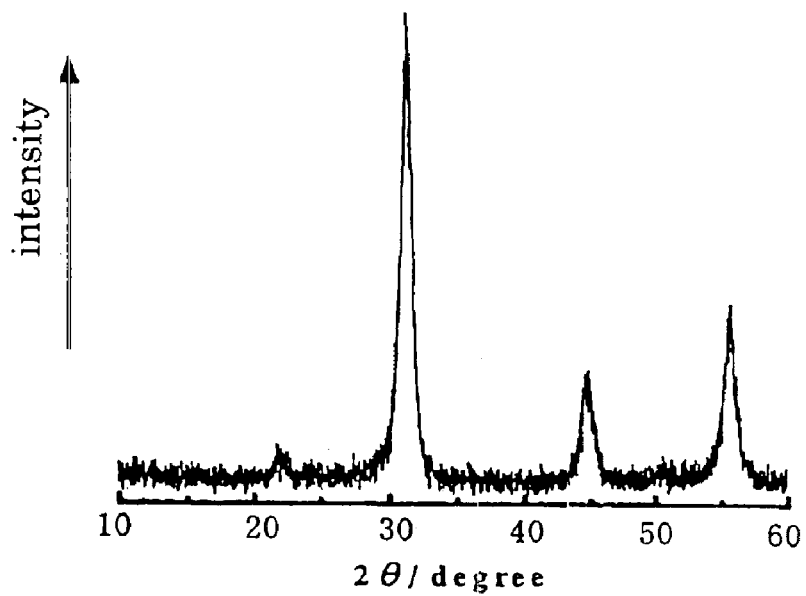
FIG. 1 is a graph showing the X-ray diffraction pattern of $LaTaON_2$ photo-catalyst.
Figure 2:
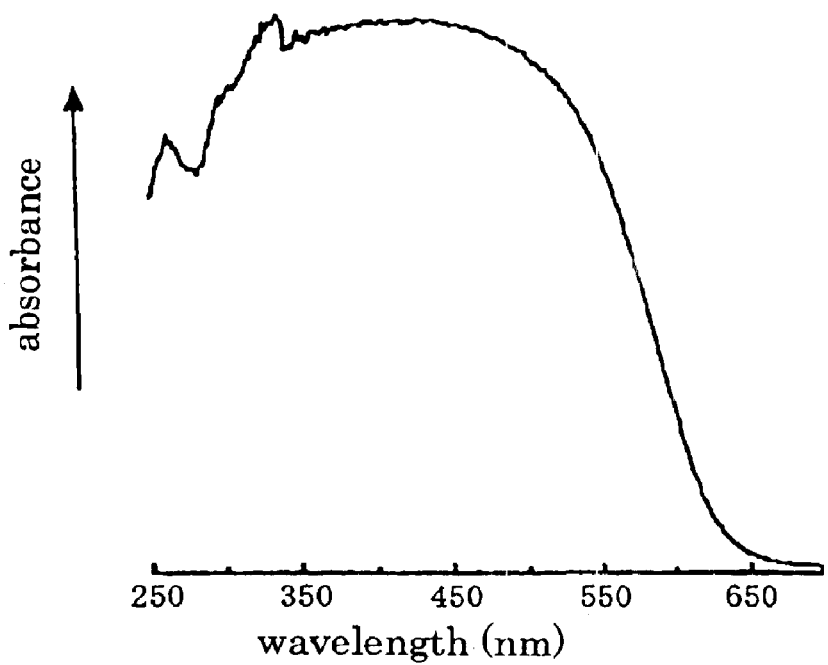
FIG. 2 is a graph showing the UV-visible diffuse reflectance spectrum of $LaTaON_2$ photo-catalyst.

X-ray diffraction of said loaded material after calcined is shown in FIG. 1. All diffraction peaks in FIG. 1 are belonging to LaTaON$_2$, and the generation of LaTaON$_2$ of perovskite structure is confirmed. The UV-visible diffuse reflectance spectrum of above mentioned material is shown in FIG. 2. As clearly understood from FIG. 2, above mentioned loaded material absorbs visible light infra 650 nm.

In FIG. 3, the change by time lapse of amount of hydrogen evolution is shown, when 0.2 g of 3 wt % Pt loaded material is suspended in 0.200 dm$^3$ of 10 vol % methanol aqueous solution and the visible light longer than 420 nm is irradiated. A xenon lamp of 300 w is used as a source of light, and visible light longer than 420 nm is irradiated by using a filter which cut the light of wave length shorter than 420 nm. As indicated in FIG. 3, it becomes clear that hydrogen can be constantly evolved from methanol aqueous solution using above mentioned loaded material under irradiation of visible light longer than 420 nm. And, in FIG. 4, the change by time lapse of amount of oxygen evolution is shown, when 0.2 g of above mentioned promoter loaded material is suspended in 0.200 dm$^3$ of 0.01 mol. dm$^{-3}$ AgNO$_3$ aqueous solution and the visible light longer than 420 nm is irradiated. By FIG. 4, it becomes clear that oxygen can be evolved from silver nitrate aqueous solution using above mentioned loaded material under irradiation of visible light longer than 420 nm.

From above mentioned facts, it is confirmed that LaTaON$_2$ has a photocatalytic activity to reduce a proton to hydrogen and oxidize water to oxygen under the irradiation of visible light longer than 420 nm.

In the meanwhile, the material is prepared by loading Pt promoter on complex oxide of La and Ta, namely LaTaO$_4$, which is not treated in ammonia gas flow. Said material is tested under visible light irradiation by same reacting condition to above mentioned Pt loaded photo-catalyst whose part of oxygen of LaTaO$_4$ is partially replaced by nitrogen. In this case, both hydrogen and oxygen are not evolved.

From these facts, the generation of compound having photocatalytic activity to visible light and having a original structure maintaining original stability of before replacement at the photocatalytic reacting condition by replacing a part of oxygen of LaTaO$_4$ with nitrogen is conjectured.

N containing amount in above mentioned compound can be slightly altered, including stoichiometric ratio of LaTaON$_2$.

Example 2

12.93 g of tantalum chloride TaCl$_5$ and 150 g of methanol CH$_3$OH are mixed and dissolved, then 150 g of ethylene glycol HOCH$_2$CH$_2$OH and 80.00 g of citric acid HCOOHCH$_2$C(OH)CH$_2$COOH are added and dissolved completely at the room temperature. 3.61 g of calcium carbonate CaCO$_3$ is added and dissolved at 130° C. with constant stirring. Further, after treated by heat at 350° C. and carbonized, heat treated at 650° C. for 2 hours in the atmospheric condition, and a complex oxide precursor of Ca and Ta is obtained. The obtained precursor is heated to 850° C. by 1° C./min temperature elevating speed under 1 dm$^3$/min ammonia NH$_3$ gas flow rate. After reached to the said temperature, the said temperature is maintained for 20 hours, and then cooled down rapidly to the room temperature under He gas flow, thus oxynitride containing Ca and Ta is synthesized. Pt, which is a promoter, is loaded on above mentioned oxynitride containing Ca and Ta by following process. Namely, tetraamminedichloroplatinum Pt(NH$_3$)$_4$Cl$_2$ is impregnated into said oxynitride containing Ca and Ta on a water bath and is loaded by hydrogen reduction at 300° C. for 2 hours. The impregnation amount of the promoter can be changed in the limits from 0.1 to 5 wt %.

X-ray diffraction of said loaded material after calcined is shown in FIG. 5. All diffraction peaks in FIG. 5 are belonging to CaTaO$_2$N, and the generation of CaTaO$_2$N is confirmed. The UV-visible diffuse reflectance spectrum of above mentioned material is shown in FIG. 6. As clearly understood from FIG. 6, above mentioned material absorbs visible light infra 570 nm.

In FIG. 7, the change by time lapse of amount of hydrogen evolution is shown, when 0.2 g of 3 wt % Pt loaded material is suspended in 0.200 dm$^3$ of 10 vol % methanol aqueous solution and the visible light longer than 420 nm is irradiated. A xenon lamp of 300 w is used as a source of light and visible light longer than 420 nm is irradiated by using a filter which cut the light of wave length shorter than 420 nm. As indicated in FIG. 7, it becomes clear that hydrogen can be constantly evolved from methanol aqueous solution using above mentioned Pt loaded material under irradiation of visible light longer than 420 nm. And, in FIG. 8, the change by time lapse of amount of oxygen evolution is shown, when 0.2 g of above mentioned Pt loaded material is suspended in 0.200 dm$^3$ of 0.01 moldm$^{-3}$AgNO$_3$ aqueous solution and the visible light longer than 420 nm is irradiated. By FIG. 8, it becomes clear that oxygen can be evolved from silver nitrate aqueous solution using above mentioned material under irradiation of visible light longer than 420 nm.

From above mentioned facts, it is confirmed that CaTaO$_2$N has a photocatalytic activity to reduce a proton to hydrogen and oxidize water to oxygen under the irradiation of visible light longer than 420 nm.

In the meanwhile, the material is prepared by loading Pt promoter on complex oxide of Ca and Ta, namely Ca$_2$Ta$_2$O$_7$, which is not treated in ammonia gas flow. Said prepared material is tested under visible light radiation by same reacting condition to above mentioned Pt loaded photocatalyst whose part of oxygen of Ca$_2$Ta$_2$O$_7$ is partially replaced by nitrogen. In this case, both hydrogen and oxygen are not evolved.

From these facts, the generation of compound having photocatalytic activity to visible light and having a original structure maintaining original stability of before replacement at the photocatalytic reacting condition by replacing a part of oxygen of Ca$_2$Ta$_2$O$_7$ with nitrogen is conjectured.

N containing amount in above mentioned compound can be slightly altered, including stoichiometric ratio of CaTaO$_2$N.

Example 3

11.04 g of tantalum chloride TaCl$_5$ and 150 g of methanol CH$_3$OH are mixed and dissolved, then 150 g of ethylene glycol HOCH$_2$CH$_2$OH and 80.00 g of citric acid HCOOHCH$_2$C(OH)CH$_2$COOH are added and dissolved completely at the room temperature. 4.55 g of strontium carbonate SrCO$_3$ is added and dissolved at 130° C. with constant stirring. Further, after treated by heat at 350° C. and carbonized, heat treated at 650° C. for 2 hours in the atmospheric condition, and a complex oxide precursor of Sr and Ta is obtained. The obtained precursor is heated to 850° C. by 1° C./min temperature elevating speed under 1 dm$^3$/min ammonia NH$_3$ gas flow rate. After reached to said temperature, said temperature is maintained for 20 hours, and then rapidly cooled down to the room temperature under He gas flow, thus oxynitride containing Sr and Ta is synthesized. Pt, which is a promoter, is loaded on above mentioned oxynitride containing Sr and Ta by following process. Namely, tetraamminedichloroplatinum Pt(NH$_3$)$_4$Cl$_2$ is impregnated into oxynitride containing Sr and Ta on water bath and is loaded by hydrogen reduction at 300° C. for 2 hours. The impregnation amount of the promoter can be changed in the limits from 0.1 to 5 wt %.

X-ray diffraction of Pt loaded material after calcined is shown in FIG. 9. All diffraction peaks in FIG. 9 are belonging to SrTaO$_2$N, and the generation of SrTaO$_2$N is confirmed. The UV-visible diffuse reflectance spectrum of above mentioned material is shown in FIG. 10. As clearly understood from FIG. 10, above mentioned material absorbs visible light infra 600 nm.

In FIG. 11, the change by time lapse of amount of hydrogen evolution is shown, when 0.2 g of 3 wt % Pt loaded material is suspended in 0.200 dm$^3$ of 10 vol % methanol aqueous solution and the visible evolution longer than 420 nm is irradiated. A xenon lamp of 300 w is used as a source of light, and visible light longer than 420 nm is irradiated by using a filter which cut the light of wave length shorter than 420 nm. As indicated in FIG. 11, it becomes clear that hydrogen can be constantly evolved from methanol aqueous solution using above mentioned Pt loaded material under irradiation of visible light longer than 420 nm. And, in FIG. 12, the change by time lapse of amount of oxygen evolution is shown, when 0.2 g of above mentioned Pt loaded material is suspended in 0.200 dm$^3$ of 0.01 mol. dm$^{-3}$ AgNO$_3$ aqueous solution and the visible light longer than 420 nm is irradiated. By FIG. 12, it becomes clear that oxygen can be evolved from silver nitrate aqueous solution using above mentioned Pt loaded material under irradiation of visible light longer than 420 nm.

From above mentioned facts, it is confirmed that SrTaO$_2$N has a photocatalytic activity to reduce a proton to hydrogen and oxidize water to oxygen under the irradiation of visible light longer than 420 nm.

In the meanwhile, the material is prepared by loading Pt promoter on complex oxide of Sr and Ta, namely Sr$_2$Ta$_2$O$_7$, which is not treated in ammonia gas flow. The prepared material is tested under visible light irradiation by same reacting condition to above mentioned Pt loaded photocatalyst whose part of oxygen of Sr$_2$Ta$_2$O$_7$ is partially replaced by nitrogen. In this case, both hydrogen and oxygen are not generated.

From these facts, the generation of compound having photocatalytic activity to visible light and having an original structure maintaining original stability of before replacement at the photocatalytic reacting condition by replacing a part of oxygen of Sr$_2$Ta$_2$O$_7$ with nitrogen is conjectured.

N containing amount in above mentioned compound can be slightly altered, including stoichiometric ratio of SrTaO$_2$N.

Example 4

9.57 g of tantalum chloride TaCl$_5$ and 150 g of methanol CH$_3$OH are mixed and dissolved, then 150 g of ethylene glycol HOCH$_2$CH$_2$OH and 80.00 g of citric acid HCOOHCH$_2$C(OH)CH$_2$COOH are added and dissolved completely at the room temperature. 5.54 g of barium carbonate BaCO$_3$ is added and dissolved at 130° C. with constant stirring. Further, after treated by heat at 350° C. and carbonized, heat treated at 650° C. for 2 hours in the atmospheric condition, and a complex oxide precursor of Ba and Ta is obtained. The obtained precursor is heated to 850° C. by 1° C./min temperature elevating speed under 1 dm$^3$/min ammonia NH$_3$ gas flow rate. After reached to said temperature, said temperature is maintained for 20 hours, and then cooled down rapidly to the room temperature under He gas flow, thus oxynitride containing Ba and Ta is synthesized. Pt, which is a promoter, is loaded on oxynitride containing Ba and Ta by following process. Namely, tetraamminedichloroplatinum Pt(NH$_3$)$_4$Cl$_2$ is impregnated into said oxynitride containing Ba and Ta on water bath and is loaded by hydrogen reduction at 573K for 2 hours. The impregnation amount of the promoter can be changed in the limits from 0.1 to 5 wt %.

X-ray diffraction of loaded material after calcined is shown in FIG. 13. All diffraction peaks in FIG. 13 are belonging to BaTaO$_2$N, and the generation of BaTaO$_2$N is confirmed. The UV-visible diffuse reflectance spectrum of above mentioned material is shown in FIG. 14. As clearly understood from FIG. 14, above mentioned material absorbs visible light infra 600 nm.

In FIG. 15, the change by lapse of amount of hydrogen evolution is shown, when 0.2 g of 3 wt % Pt loaded material is suspended in 0.200 dm$^3$ of 10 vol % methanol aqueous solution and the visible light longer than 420 nm is irradiated. A xenon lamp of 300 w is used as a source of light and visible light longer than 420 nm is irradiated by using a filter which cut the light of wave length shorter than 420 nm. As indicated in FIG. 15, it becomes clear that hydrogen can be constantly evolved from methanol aqueous solution using above mentioned Pt loaded material under irradiation of visible light longer than 420 nm. And, in FIG. 16, the change by time lapse of amount of oxygen evolution is shown, when 0.2 g of above mentioned Pt loaded material is suspended in 0.200 dm$^3$ of 0.01 moldm$^{-3}$ AgNO$_3$ aqueous solution and the visible light longer than 420 nm is irradiated. By FIG. 16, it becomes clear that oxygen can be evolved from silver nitrate aqueous solution using above mentioned Pt loaded material under irradiation of visible light longer than 420 nm.

From above mentioned facts, it is confirmed that BaTaO$_2$N has a photocatalytic activity to reduce a proton to hydrogen and oxidize water to oxygen under the irradiation of visible light longer than 420 nm.

In the meanwhile, the material is prepared by loading Pt promoter on complex oxide of Ba and Ta, namely Ba$_2$Ta$_2$O$_7$, which is not treated in ammonia gas flow. Said material is tested under visible light by same reacting condition to above mentioned Pt loaded photo-catalyst whose part of oxygen of Ba$_2$Ta$_2$O$_7$ is partially replaced by nitrogen. In this case, both hydrogen and oxygen are not generated.

From these facts, the generation of compound having photocatalytic activity to visible light and having an original structure maintaining original stability of before replacement at the photocatalytic reacting condition by replacing a part of oxygen of Ba$_2$Ta$_2$O$_7$ with nitrogen is conjectured.

N containing amount in above mentioned compound can be slightly altered, including stoichiometric ratio of BaTaO$_2$N.

Example 5

14.29 g of niobium chloride NbCl$_5$ and 150 g of methanol CH$_3$OH are mixed and dissolved, then 150 g of ethylene glycol HOCH$_2$CH$_2$OH and 80.00 g of citric acid HCOOHCH$_2$C(OH)CH$_2$COOH are added and dissolved completely at the room temperature. 5.30 g of calcium carbonate CaCO$_3$ is added and dissolved at 130° C. with constant stirring. Further, after treated by heat at 350° C. and carbonized, heat treated at 650° C. for 2 hours in the atmosphere condition, and a complex oxide precursor of Ca and Nb is obtained. The obtained precursor is heated to 850° C. by 1° C./min temperature elevating speed under 1 dm$^3$/min ammonia NH$_3$ gas flow rate. After reached to said temperature, said temperature is maintained for 20 hours, and then rapidly cooled down to the room temperature under He gas flow, thus oxynitride containing Ca and Nb is synthesized.

Pt, which is a promoter, is loaded on oxynitride containing Ca and Nb by following process. Namely, tetraamminedichloroplatinum Pt(NH$_3$)$_4$Cl$_2$ is impregnated into oxynitride containing Ca and Nb on water bath and is loaded by hydrogen reduction at 300° C. for 2 hours. The impregnation amount of the promoter can be changed in the limits from 0.1 to 5 wt %.

X-ray diffraction of Pt loaded material after calcined is shown in FIG. 17. All diffraction peaks in FIG. 17 are belonging to CaNbO$_2$N, and the generation of CaNbO$_2$N is confirmed. The UV-visible diffuse reflectance spectrum of above mentioned Pt loaded material is shown in FIG. 18. As clearly understood from FIG. 18, above mentioned material absorbs visible light infra 630 nm.

In FIG. 19, the change by lapse of amount of hydrogen evolution is shown, when 0.2 g of 3 wt % Pt loaded material is suspended in 0.200 dm$^3$ of 10 vol % methanol aqueous solution and the visible light longer than 420 nm is irradiated.

A xenon lamp of 300 w is used as a source of light, and visible light longer than 420 nm is irradiated by using a filter which cut the light of wave length shorter than 420 nm. As indicated in FIG. 19, it becomes clear that hydrogen can be constantly evolved from methanol aqueous solution using above mentioned material under irradiation of visible light longer than 420 nm. And, in FIG. 20, the change by time lapse of amount of oxygen evolution is shown, when 0.2 g of above mentioned Pt loaded material is suspended in 0.200 dm$^3$ of 0.01 mol. dm$^{-3}$ AgNO$_3$ aqueous solution and the visible light longer than 420 nm is irradiated. By FIG. 20, it becomes clear that oxygen can be generated from silver nitrate aqueous solution using above mentioned Pt loaded material under irradiation of visible light longer than 420 nm.

From above mentioned facts, it is confirmed that CaNbO$_2$N has a photocatalytic activity to reduce a proton to hydrogen and oxidize water to oxygen under the irradiation of visible light longer than 420 nm.

In the meanwhile, the material is prepared by loading Pt promoter on complex oxide of Ca and Nb, namely Ca$_2$Nb$_2$O$_7$, which is not treated in ammonia gas flow. Said prepared material is tested under visible light by same reacting condition to above mentioned Pt loaded photocatalyst whose part of oxygen of Ca$_2$Nb$_2$O$_7$ is partially replaced by nitrogen. In this case, both hydrogen and oxygen are not evolved.

From these facts, the generation of compound having photocatalytic activity to visible light and having a original structure maintaining original stability of before replacement at the photocatalytic reacting condition by replacing a part of oxygen of Ca$_2$Nb$_2$O$_7$ with nitrogen is conjectured.

N containing amount in above mentioned compound can be slightly altered, including stoichiometric number ratio of CaNbO$_2$N.

Example 6

5.68 g of titaniumisopropoxide Ti[OCH(CH$_3$)$_2$]$_4$ and 98.81 g of ethylene glycol HOCH$_2$CH$_2$OH are mixed together, then 8.66 g of lanthanum nitrate 6hydrate La(NO$_3$)$_3$·6H$_2$O is added and dissolved at room temperature with constant stirring. 76.49 g of citric acid HCOOHCH$_2$C(OH)CH$_2$COOH and 102.0 g of methanol CH$_3$OH are added and dissolved at 130° C. with constant stirring. Further, after treated by heat at 350° C. and carbonized, heat treated at 650° C. for 2 hours in the atmospheric condition, and a complex oxide precursor of La and Ti is obtained. The obtained precursor is heated to 950° C. by 1° C./min temperature elevating speed under 1 dm$^3$/min ammonia NH$_3$ gas flow rate. After reached to the said temperature, said temperature is maintained for 15 hours, and then cooled down rapidly to the room temperature under Ar gas flow, thus oxynitride containing Ti and La is synthesized. Pt, which is a promoter, is loaded on oxynitride containing Ti and La by following process. Namely, 0.00357dm$^3$ (Pt 7 wt %) of 0.1moldm$^{-3}$ tetraamminedichloroplatinum Pt(NH$_3$)$_4$Cl$_2$ solution is impregnated into 0.3 g of said oxynitride containing Ti and La on a water bath so as to evaporate water and is loaded by hydrogen reduction at 300° C. for 2 hours.

X-ray diffraction of loaded material after calcined is shown in FIG. 21. All diffraction peaks in FIG. 21 are belonging to LaTiO$_2$N, and the generation of laTiO$_2$N is confirmed. The UV-visible diffuse reflectance spectrum of above mentioned material is shown in FIG. 22. As clearly understood from FIG. 22, above mentioned loaded material absorbs visible light infra 600 nm.

In FIG. 23, the change by lapse of amount of hydrogen evolution is shown, when 0.2 g of 7 wt % Pt loaded material is suspended in 0.310 dm$^3$ of 10 vol % methanol aqueous solution and the visible light longer than 400 nm is irradiated. A high voltage mercury lamp of 450w is used as a source of light, and visible light longer than 400 nm is irradiated by using a filter of sodium nitrite aqueous solution.

As indicated in FIG. 23, it becomes clear that hydrogen can be constantly generated from methanol aqueous solution using above mentioned material under irradiation of visible light longer than 400 nm. And, in FIG. 24, the change by time lapse of amount of oxygen evolution is shown, when 0.2 g of above mentioned Pt loaded material is suspended in 0.310 dm$^3$ of 0.01 mol. dm$^{-3}$ AgNO$_3$ aqueous solution and the visible light longer than 400 nm is irradiated. By FIG. 24, it becomes clear that oxygen can be generated from silver nitrate aqueous solution using above mentioned material under irradiation of visible light longer than 400 nm.

From above mentioned facts, it is confirmed that LaTiO$_2$N has an ability to reduce a proton to hydrogen and oxidize water to oxygen under the irradiation of visible light radiation longer than 400 nm.

In the meanwhile, the material is prepared by loading platinum promoter on complex oxide of La and Ti which is not treated in ammonia gas flow. The prepared material is tested under visible light irradiation by same reacting condition to above mentioned Pt loaded photo-catalyst whose part of oxygen of La$_2$Ti$_2$O$_7$ is partially replaced by nitrogen. In this case, both hydrogen and oxygen are not evolved.

From these facts, the generation of compound having photo activity to visible light and having an original structure maintaining original stability of before replacement at the photocatalytic reacting condition by replacing a part of oxygen of La$_2$Ti$_2$O$_7$ with nitrogen is conjectured.

N containing amount in above mentioned compound can be slightly altered, including stoichiometric ratio of LaTiO$_2$N.

Example 7

5.00 g of tantalum oxide is heated to 850° by 1° C./min temperature elevating speed under 20 cm³/min ammonia NH₃ gas flow rate and maintained said temperature for 20 hours. Then cooled down rapidly to the room temperature under NH₃ gas flow, and oxynitride containing Ta is synthesized.

Pt, which is a promoter, is loaded on above mentioned oxynitride containing Ta material by following process. Namely, tetraamminedichloroplatinum Pt(NH₃)₄Cl₂ is impregnated into said oxynitride containing Ta material on water bath and is loaded by hydrogen reduction at 300° C. for 2 hours. The impregnation amount of the promoter can be changed in the limits from 0.1 to 5 wt %.

X-ray diffraction of said Pt loaded material after calcined is shown in FIG. 25. All diffraction peaks in FIG. 25 are belonging to TaON, and the generation of TaON is confirmed. The UV-visible diffuse reflectance spectrum of above mentioned Pt loaded material is shown in FIG. 26. As clearly understood from FIG. 26, above mentioned Pt loaded material absorbs light radiation infra 550 nm.

In FIG. 27, the change by lapse of time of amount of hydrogen evolution is shown, when 0.2 g of 3 wt % platinum loaded material is suspended in 0.200 dm³ of 10 vol % methanol aqueous solution and the visible light longer than 420 nm is irradiated.

A xenon lamp of 300 w is used as a source of light, and visible light longer than 420 nm is irradiated by using a filter which cut the light of wave length shorter than 420 nm. As indicated in FIG. 27, it becomes clear that hydrogen can be constantly evolved from methanol aqueous solution using above mentioned loaded material under irradiation of visible light longer than 420 nm. And, in FIG. 28, the change by time lapse of amount of oxygen evolution is shown, when 0.2 g of above mentioned loaded material is suspended in 0.200 dm³ of 0.01 mol. dm⁻³ AgNO₃ aqueous solution and the visible light longer than 420 nm is irradiated. By FIG. 28, it becomes clear that oxygen can be evolved from silver nitrate aqueous solution using above mentioned Pt loaded material under irradiation of visible light longer than 420 nm.

From above mentioned facts, it is confirmed that TaON has a photocatalytic activity to reduce a proton to hydrogen and oxidize water to oxygen under the irradiation of visible light longer than 420 nm.

In the meanwhile, a material is prepared by loading platinum promoter on tantalum oxide Ta₂O₅ which is not treated in ammonia gas flow. Said material is tested under visible light by same reacting condition to above mentioned loaded photo-catalyst whose part of oxygen of Ta₂O₅ is partially replaced by nitrogen. In this case, both hydrogen and oxygen are not evolved.

From these facts, the generation of compound having photocatalytic activity to visible light and having an original structure maintaining original stability of before replacement at the photocatalytic reacting condition by replacing a part of oxygen of Ta₂O₅ with nitrogen is conjectured.

N containing amount in above mentioned compound can be slightly altered, including integral number ratio of TaON.

The oxynitride in the present invention is the photo-catalyst which can evolve hydrogen and oxygen by irradiation of visible light radiation under the presence of an electron-donor sacrificial reagent (methanol) and an electron-acceptor sacrificial reagent (silver nitrate). This fact indicates that the oxynitride of the present invention has a possibility to decompose water completely under the irradiation of visible light. When an electric charge separating effect is enhanced by removing a lattice defect which can be a recombination site of an electron and a hole and by adding optimum hydrogen generating promoter and oxidation promoter of water, the oxynitride of the present invention can be a photo-catalyst which decomposes water completely by the irradiation of visible radiation.

POSSIBILITY FOR THE INDUSTRIAL USE

As mentioned above, the photo-catalyst obtained by the present invention, is the catalyst that acts by visible radiation, which is the majority in sun light reaching to the surface of the earth. By carrying out photocatalyst reaction with sun light, the useful compound can be produced. Further, as indicated in Examples, since said photo-catalyst has an ability to decompose water to hydrogen and oxygen by visible radiation, it is hopeful to be used as a photo-catalyst convert sun light to hydrogen which is considered as the energy of next generation.

What is claimed is:

1. A photocatalyst comprising:
   oxynitride consisting of TaON on which Pt is loaded as a promoter.

2. A photocatalyst comprising:
   oxynitride containing Ta, Ti or Nb as a transition metal on which Pt is loaded as a promoter
   wherein the oxynitride further contains at least one element selected from the group consisting of metal elements belonging to alkali, alkali earth and 3 group.

3. A photocatalyst of claim 2, wherein the metal element contained in the oxynitride is at least one selected from the group consisting of Ca, Sr, Ba, K, Rb and La.

4. A photocatalyst comprising:
   oxynitride containing at least one transition metal wherein the transition metal contained in the oxynitride is at least one selected from the group consisting of Ta, Nb, Ti and Zr
   and wherein the oxynitride further contains at least one element selected from the group consisting of metal elements belonging to alkali, alkali earth and 3 group
   and wherein a promoter comprising transition metal is loaded on the oxynitride wherein the promoter loaded on the oxynitride is Pt.

5. A process for photodecomposition of water comprising:
   exposing water to at least visible light in the presence of a photocatalyst comprising oxynitride containing at least one transition metal on which promoter is loaded
   wherein the oxynitride photocatalyst further contains at least one element selected from the group consisting of metal elements belonging to alkali, alkali earth and 3 group.

6. The process of claim 5, wherein the transition metal contained in the oxynitride is at least one selected from the group consisting of Ta, Ti and Nb
   wherein the metal element contained in the oxynitride is at least one selected from the group consisting of Ca, Sr, Ba, K, Rb and La.

7. The process of claim 6, wherein the promoter is Pt.

* * * * *